United States Patent [19]
Gretener

[11] 3,764,083
[45] Oct. 9, 1973

[54] BALANCED MOUNTABLE PACKAGE TUBE AND METHOD OF MAKING SAME
[75] Inventor: Albert Gretener, Zug, Switzerland
[73] Assignee: Gretener Ltd., Cham, Switzerland
[22] Filed: July 12, 1972
[21] Appl. No.: 270,888

[52] U.S. Cl............... 242/46.21, 64/1 V, 242/118.3
[51] Int. Cl............................................. B65h 75/30
[58] Field of Search.................... 74/573; 64/1 V; 188/1 B; 57/129, 130; 242/46.2, 46.21, 46.3, 46.4, 46.5, 118.3, 118.31, 118.32

[56] References Cited
UNITED STATES PATENTS
2,463,591  3/1949  Bauer............................. 242/46.21
3,497,149  2/1970  L'Allemand..................... 242/46.21

Primary Examiner—Charles J. Myhre
Assistant Examiner—F. D. Shoemaker
Attorney—Hugh A. Chapin et al.

[57] ABSTRACT

A balanced package tube is provided by initially positioning the coupling element and closure element so that a limited access opening is provided for the longitudinally extending circumferentially spaced recesses in each. After determining the unbalance, the weight bodies are inserted in the appropriate recesses and the access openings closed either by moving the whole element into the hollow body or by moving a hub relative to the recess-defining insert.

6 Claims, 6 Drawing Figures

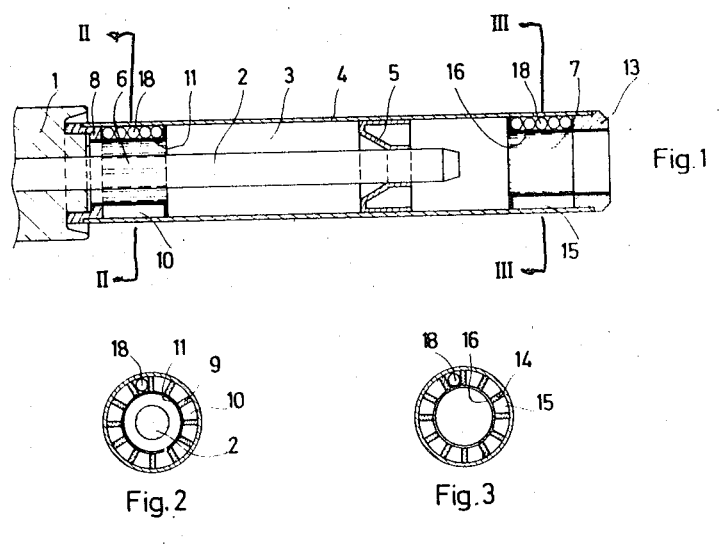

BALANCED MOUNTABLE PACKAGE TUBE AND METHOD OF MAKING SAME

This invention relates to a balanced mountable package tube and a method of making the same, particularly for drawtwisting machines.

Heretofore, package tubes have been provided with recesses at the ends which are distributed about the circumference to receive weight bodies for balancing purposes. The number of weight bodies, mostly lead balls, which have been used have been inserted into the recesses, after a determination is made of the unbalance. Thereafter, the recesses have been closed by a cover which has not entered into the determination of the unbalance or the lead balls have been deformed by a tool to such a degree as to be prevented from dropping off. However, both of these methods of preventing the falling off of the weight bodies have the disadvantage that sufficient precision of the balancing process cannot be reached or that such are suitable only for robust tube constructions subject to pressure and impact.

The continuing increase in rotatational speeds of the spindles require higher standards with respect to balance, particularly for package tubes used on drawtwisting machines. As a result, there is a need for tubes of relatively light construction. However, such light tubes are not suitable for the deformable pressing in of weight bodies.

Accordingly, it is an object of the invention to correct the unbalance of a complete package tube.

It is another object of the invention to obtain a substantially precisely balanced package tube.

It is another object of the invention to provide a light weight package tube of a high degree of balance.

Briefly, the invention provides a balanced package tube for machines such as drawtwisters and a method of making the same.

The balanced package tube is constructed of a hollow cylindrical body, a coupling element mounted in a coupling end of the hollow body and a closure element in a closure end of the hollow body. The coupling element has a plurality of circumferentially spaced apart longitudinally extending recesses with the hollow body for receiving weight bodies and a hub which closes off the recesses to the interior of the hollow body. The closure element is of similar construction.

In one embodiment, the coupling element and the closure element each include an insert which defines the recesses and is slidable in the hollow body while the hub is rigidly connected within the insert to move with the insert. In order to make this package tube, the method of the invention includes an initial positioning of the hub of each element relative to the hollow body so as to leave an opening sufficient only to permit insertion of a weight body into a recess. Thereafter, the unbalance of the package tube is determined, for example, by a dynamic balancing machine and a determined number of weight bodies to achieve balance is inserted into determined recesses of the elements. Finally, the hubs are moved within the hollow body to close the recesses.

In another embodiment, the coupling element and closure element each include an insert which defines the recesses and a hub which is slidably mounted in the insert to selectively open and close the recesses to the interior of the hollow body. In making this package tube, a similar sequence of steps as above are followed. However, in this case, the hub is initially slid to a determination of balance. After insertion of the weight bodies, the insert for balancing while leaving an access opening to the recesses and thereafter slid outwardly of the insert over the opening to close off the recesses.

In another embodiment, the hub of each element is made of two parts, with one hub part rigidly connected to the insert of the element and the other slidably mounted in the insert to close off the recesses. In the method of making this package tube, the movable hub parts are shifted to provide an access opening to the recesses in each element prior bodies, the movable hub parts are closed over the recesses.

These and other objects and advantages of the invention will become more apparent from the following detailed description and appended claims taken in conjunction with the accompanying drawings in which:

FIG. 1 illustrates a cross-sectional view of a balance package tube according to the invention in place on a spindle;

FIG. 2 illustrates a view taken on line II—II of FIG. 1 of the coupling end of the package tube;

FIG. 3 illustrates a view taken on line III—III of FIG. 1 of the closure end of the package tube;

Figure 4:
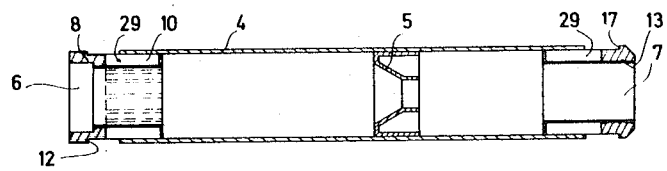
FIG. 4 illustrates a cross-sectional view of the package tube of FIG. 1 prior to balancing.

Referring to FIG. 1, a whorl 1 having a spindle 2, as is known, has a package tube 3 mounted on the spindle 2 in abutment with the recessed end of the whorl 1. The package tube 3 consists of a rigid, cylindrical hollow body 4, a centering element 5 for engaging the spindle 2, a coupling element 6, and a closure element 7.

Referring to FIGS. 1 and 4, the coupling element 6 hugging the whorl 1 serves to couple the package tube 3 to the whorl 1 as shown. In addition, the coupling element 6 includes an annular coupling insert 8 which is slidably mounted in the coupling end of the hollow body 4 and has a plurality of integral ribs 9 (FIG. 2) extending longitudinally into the hollow body 4. The ribs 9 are spaced apart circumferentially of the insert 8 to form recesses 10 therebetween and a hub 11 is secured to the insert 8 under the ribs 9 and extends into the hollow body 4 to close off the bottoms of the recesses 10 to the interior of the hollow body 4. Also, the coupling element 6 has a stop 12 (FIG. 4) formed thereon to abut against the end of the hollow body 4.

The closure element 7 serves to close the free end of the hollow body 4. This closure element 7 includes a closure insert 13 which is slidably mounted in the closure end of the hollow body 4 and has a plurality of integral ribs 14 (FIG. 3) extending longitudinally into the hollow body 4. The ribs 14, as ribs 9 above, are spaced apart circumferentially of the insert to form recesses 15 therebetween and a hub 16 is rigidly connected within the insert 13 under the ribs 14 as above. Also, a stop 17 is formed on the insert 13 to abut against the free end of the hollow body 4.

The respective recesses 10, 15 of coupling element 6 and the closure element 7 are sized to receive weight bodies 18 for example, with a limit of five weight bodies 18 per recess.

In use, the degree of unbalance of the package tube 3 is first determined with the coupling element 6 and closure element 7 in extended positions relative to the hollow body 4 and only so far that openings 29 (FIG. 4) are formed to permit insertion of the weight bodies 18 into each. After determining the unbalance and the number of weight bodies 18 required to achieve balance, the determined number of weight bodies 18 are inserted into the determined recess 10, 15 or recesses 10, 15 via an opening 29. The elements 6, 7 are then inserted completely into the hollow body 4 up to the stops 12, 17 respectively so that the openings 29 are closed.

Figure 5:
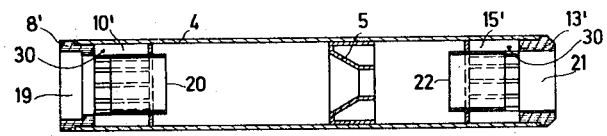
FIG. 5 illustrates a cross-sectional view of a modified package tube according to the invention prior to balancing.

Referring to FIG. 5, wherein like reference characters indicate like parts as above, the package tube can be constructed with modified coupling and closure elements. To this end, the coupling element 19 consists of a coupling insert 8, as above, secured in the coupling end of the hollow body 4 and an axially movable hub 20 which is slidably mounted in the insert 8' to selectively open and close off the recesses 10' therein. Similarly, the closure element 21 consists of a closure insert 13' secured in the closure end of the hollow body 4 and an axially movable hub 22 slidably mounted in the insert 13' to close off the recesses 15 therein.

In use, the movable hubs 20, 22 are inserted into the respective inserts 8', 13' so far only that an opening 30 for inserting the weight bodies into the recesses 10', 15' remains open. After determining the unbalance and the number of weight bodies needed to balance, the weight bodies are inserted via the openings 30 into one or more recesses 10', 15' in one or both of the elements 19, 21. Next, the hubs 20, 22 are inserted completely into the insets 8', 13' to close the openings 30.

Figure 6:
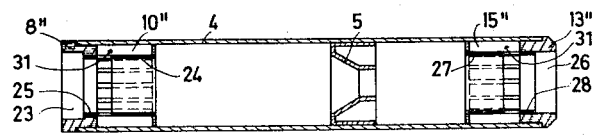
FIG. 6 illustrates a cross-sectional view of a further modified package tube according to the invention prior to balancing.

Referring to FIG. 6, wherein like reference characters indicate like parts as above, the package tube can also be constructed with further modified coupling and closure elements. As shown, the coupling element 23 consists of a coupling insert 8'', as above, secured in the coupling end of the hollow body 4, a hub part 24 rigidly connected to the insert 8'' and an axially movable hub part 25 slidably mounted in the insert 8'' to selectively open and close off the recess 10''. Similarly, the closure element 26 consists of a closure insert 13' secured in the closure end of the hollow body 4, a hub part 27 rigidly connected to the insert 8'' and an axially movable hub part 28 slidably mounted in the insert 8''.

In use, the movable hub parts 25, 28 are inserted into the respective inserts 8'', 13'' so far only that an opening 31 for insertion of the weight bodies into the recesses 10'', 15'' remains open. After determining the unbalance and the number of weight bodies needed to balance, the weight bodies are inserted via the openings 31 into one or more recesses 10'', 15'' in one or both elements 23, 26. Next, the openings 31 are closed by axially moving the hub parts 25, 28, respectively.

The advantage of package tubes balanced in the above manner is seen in that the precision of dynamic balance is determined not merely by the precisions of the individual parts but by determining and correcting the unbalance of the complete package tube. That is, the weight bodies can be inserted into recesses already provided and taken into account in determining the unbalance and these recesses can be closed by the mere axial moving of elements also taken into account in determining the unbalance. In this manner, unbalance can be balanced to a considerably higher degree, which is of great importance, for example, for elastically supported spindles.

What is claimed is:

1. A balanced package tube comprising
   a cylindrical hollow body;
   a coupling element mounted in a coupling end of said hollow body having a plurality of circumferentially spaced apart longitudinally extending recesses within said hollow body for receiving weight bodies therein and a hub closing off said recesses to the interior of said hollow body; and
   a closure element mounted in a closure end of said hollow body having a plurality of circumferentially spaced apart longitudinally extending recesses within said hollow body for receiving weight bodies therein and a hub closing off said recesses to the interior of said hollow body.

2. A balanced package tube as set forth in claim 1 wherein at least one of said coupling element and said closure element includes an insert slidably mounted in said hollow body and rigidly connected to said hub to define said recesses.

3. A balanced package tube as set forth in claim 1 wherein at least one of said coupling element and said closure element includes an insert mounted in said hollow body, said hub being slidably mounted within said insert to selectively open and close said recesses to the interior of said hollow body.

4. A balanced package tube as set forth in claim 1 wherein at least one of said coupling element and said closure element includes an insert mounted in said hollow body, and said hub includes a first hub part rigidly connected to said insert and a second hub part axially slidably mounted in said insert to selectively open and close said recesses to the interior of said hollow body.

5. A balanced package tube as set forth in claim 1 wherein at least one of said coupling element and said closure element includes an insert having a plurality of longitudinally extending circumferentially spaced ribs defining said recesses.

6. A method of making a balanced mountable package tube having a cylindrical hollow body, a coupling element having circumferentially spaced recesses inserted into one end of the hollow body and a closure element having circumferentially spaced recesses inserted into the opposite end, each element having at least one slidable hub defining an inner limitation of the recesses therein, said method comprising the steps of
   positioning the hub of each element relative to the hollow body to leave an opening sufficient only to permit insertion of weight bodies into the recesses of each element;
   thereafter determining the unbalance of the package tube;
   subsequently inserting a determined number of weight bodies into determined recesses of the elements; and
   thereafter moving each hub to close the recesses within the hollow body.

* * * * *

UNITED STATES PATENT OFFICE
CERTIFICATE OF CORRECTION

Patent No. 3,764,083     Dated October 9, 1973

Inventor(s) Albert Gretener

It is certified that error appears in the above-identified patent and that said Letters Patent are hereby corrected as shown below:

On the title page insert the following:

--Priority: Switzerland  10620/71
           filed July 19, 1971.--

Signed and sealed this 29th day of October 1974.

(SEAL)
Attest:

McCOY M. GIBSON JR.                C. MARSHALL DANN
Attesting Officer                  Commissioner of Patents